May 26, 1925. 1,539,770
W. W. REINELT
CLUTCH PEDAL HOLDER
Filed June 3, 1924
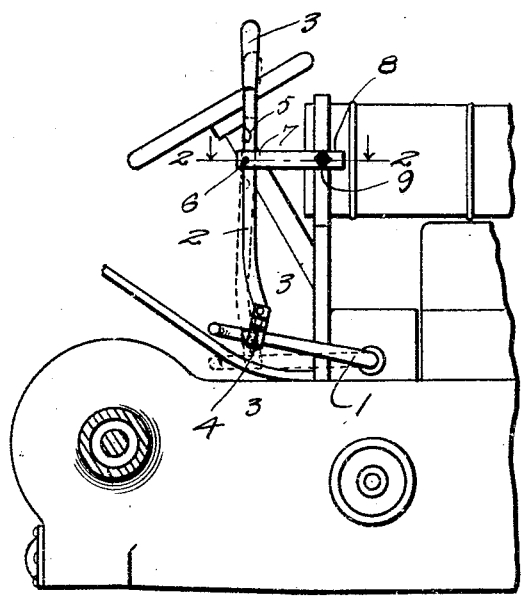
Fig. 1.
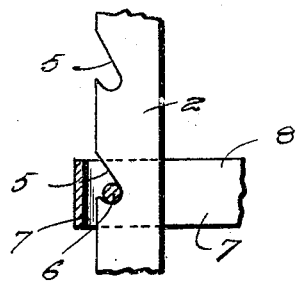
Fig. 4.
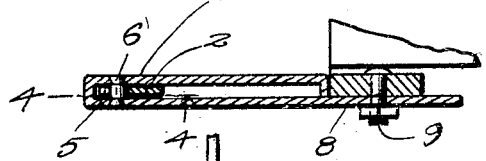
Fig. 2.
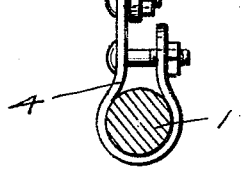
Fig. 3.
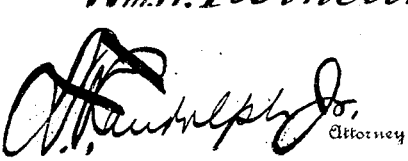
Inventor
Wm. W. Reinelt,
By
Attorney Patented May 26, 1925.

1,539,770

UNITED STATES PATENT OFFICE.

WILLIAM W. REINELT, OF DECKERVILLE, MICHIGAN.

CLUTCH-PEDAL HOLDER.

Application filed June 3, 1924. Serial No. 717,601.

*To all whom it may concern:*

Be it known that I, WILLIAM W. REINELT, a citizen of the United States, residing at Deckerville, in the county of Sanilac and State of Michigan, have invented certain new and useful Improvements in Clutch-Pedal Holders; and I do hereby declare the following to a full, clear, and exact description of the invention, such as will enable others skilled in the art to which it appertains to make and use the same.

The object of this invention is the provision of means for holding the clutch pedal of a Fordson tractor depressed, said means being in the nature of an attachment so as to be readily applied to any Fordson tractor in use and which may be installed without requiring any change in the construction or the services of a skilled mechanic.

Other objects and advantages will be apparent and suggest themselves as the nature of the invention is understood.

While the drawings illustrate an embodiment of the invention it is to be understood that in adapting the same to meet different conditions and requirements, various changes in the form, proportion and minor details of construction may be resorted to without departing from the spirit of the invention.

Referring to the accompanying drawing forming a part of the application:

Figure 1 is a detail view showing the application of the invention;

Figure 2 is a sectional detail on the line 2—2 of Figure 1;

Figure 3 is a sectional detail on the line 3—3 of Figure 1;

Figure 4 is a fragmental sectional view on a plane indicated by the line 4—4 of Figure 2.

Corresponding and like parts are referred to in the following description and designated in the several views of the drawing by like reference characters.

The numeral 1 designates the clutch pedal of a Fordson tractor and it is the purpose of the present invention to hold the same depressed, thereby leaving the hands and feet of the operator free and unincumbered.

The attachment comprises a bar 2 provided at one end with a handle 3 and pivoted at its opposite end to a clip 4 which is fitted to the clutch pedal 1 to which it is clamped. The bar 2 is provided with upwardly inclined notches 5 in an edge portion thereof which are adapted to engage a stop 6 which as shown consists of a pin located at one end of a loop 7 formed by bending an end portion of a metal strap 8 upon itself, said pin serving to connect the folded portions of the metal strap. The bar 2 passes through the loop 7. The guide formed by the metal strap 8 is secured at one end to a convenient part of the tractor by a suitable fastening 9. When the clutch pedal 1 is depressed a notch 5 of the bar 2 engages the stop 6 thereby holding the clutch pedal depressed in the required position and leaving both the hands and the feet of the operator free.

What is claimed is:—

An attachment for holding the clutch pedal of a Fordson tractor depressed, the same consisting of a clip adapted to be applied to the clutch pedal, a bar pivoted to the clip and having upwardly inclined notches in an edge portion thereof, and a guide consisting of a metal strap having an end portion doubled upon itself to provide a loop through which the bar passes, and a pin connecting the folded portions of the metal strap and adapted to engage a notch of the bar and hold the same in the required adjusted position.

In testimony whereof I affix my signature in presence of two witnesses.

WILLIAM W. REINELT.

Witnesses:
W. HENRY PRENTISS,
PEARL M. REINELT.